United States Patent [19]
Tran et al.

[11] Patent Number: 5,452,865
[45] Date of Patent: Sep. 26, 1995

[54] AIRCRAFT FREQUENCY ADAPTIVE MODAL SUPPRESSION SYSTEM

[75] Inventors: Chuong B. Tran, Lynnwood; Stephen White, Bothell, both of Wash.

[73] Assignee: The Boeing Company, Seattle, Wash.

[21] Appl. No.: 86,447

[22] Filed: Jun. 28, 1993

[51] Int. Cl.⁶ ............................ B64C 13/16; G05D 1/00; G06G 7/70
[52] U.S. Cl. .................. 244/75 A; 244/195; 364/434
[58] Field of Search ................ 244/76 R, 75 A, 244/191, 194, 195; 364/434

[56] References Cited

U.S. PATENT DOCUMENTS

| | | | |
|---|---|---|---|
| 3,572,618 | 3/1971 | Willett | 244/77 |
| 3,643,073 | 2/1972 | Sawamura | 235/150.2 |
| 3,746,997 | 7/1973 | Willett et al. | 325/349 |
| 4,340,870 | 7/1982 | Dydyk | 331/56 |
| 4,725,020 | 2/1988 | Whitener | 244/76 R |
| 5,072,893 | 12/1991 | Chakravarty | 244/76 |
| 5,224,667 | 7/1993 | Lacabanne | 244/75 A |

*Primary Examiner*—Andres Kashnikow
*Assistant Examiner*—Virna Lissi Mojica
*Attorney, Agent, or Firm*—Conrad O. Gardner

[57] ABSTRACT

An aircraft modal suppression system which recognizes that the frequency and phase of the body bending mode varies when the weight of the aircraft differs from the design gross weight. An active damper notch filter which is tabulated as a function of aircraft gross weight is utilized, thereby enabling not only the frequency, but also the width and depth of the notch filter to vary according to the gross weight of the aircraft.

2 Claims, 10 Drawing Sheets

TABLE 1: VARIABLE YD NOTCH FILTER $$\frac{S^2 + K_1 S + K_3}{S^2 + K_2 S + K_3}$$

| N | WEIGHT RANGE (1000 LBS.) | $K_3$ |
|---|---|---|
| 1 | MAX - 385 | 309 (2.8 HZ) |
| 2 | 384 - 355 | 332 (2.9 HZ) |
| 3 | 354 - 325 | 355 (3.0 HZ) |
| 4 | 324 - 295 | 379 (3.1 HZ) |
| 5 | 294 - 265 | 404 (3.2 HZ) |
| 6 | 264 - 235 | 430 (3.3 HZ) |
| 7 | 234 - 205 | 456 (3.4 HZ) |
| 8 | 204 - MIN | 484 (3.5 HZ) |

$K_1, K_2$ ARE ARBITRARY & CAN BE CHOSEN SUCH THAT DEPTH OF NOTCH FILTER (dB) = $20 LOG(K_1, K_2)$

Fig. 3.

TABLE 2: MULTIPLE GAIN SCHEDULE & VARIABLE FILTERS

10 → $G_r$ WHERE $r = 1, 2, \ldots (n-1), n$; $n$ = NUMBER OF GROSS WEIGHT RANGES 20 →
$$\frac{A_0 S^p + A_1 S^{p-1} + \cdots + A_{p-1} S + A_p}{B_0 S^q + B_1 S^{q-1} + \cdots + B_{q-1} S + B_q}$$

WHERE

22 → $A_0 = \begin{bmatrix} a_{0,1} \\ a_{0,2} \\ \vdots \\ a_{0,(n-1)} \\ a_{0,n} \end{bmatrix}$; 24 → $A_1 = \begin{bmatrix} a_{1,1} \\ a_{1,2} \\ \vdots \\ a_{1,(n-1)} \\ a_{1,n} \end{bmatrix}$; $\ldots$, 26 → $A_{p-1} = \begin{bmatrix} a_{(p-1),1} \\ a_{(p-1),2} \\ \vdots \\ a_{(p-1),(n-1)} \\ a_{(p-1),n} \end{bmatrix}$; 28 → $A_p = \begin{bmatrix} a_{p,1} \\ a_{p,2} \\ \vdots \\ a_{p,(n-1)} \\ a_{p,n} \end{bmatrix}$ 30 → $B_0 = \begin{bmatrix} b_{0,1} \\ b_{0,2} \\ \vdots \\ b_{0,(n-1)} \\ b_{0,n} \end{bmatrix}$; 32 → $B_1 = \begin{bmatrix} b_{1,1} \\ b_{1,2} \\ \vdots \\ b_{1,(n-1)} \\ b_{1,n} \end{bmatrix}$; $\ldots$; 34 → $B_{q-1} = \begin{bmatrix} b_{(q-1),1} \\ b_{(q-1),2} \\ \vdots \\ b_{(q-1),(n-1)} \\ b_{(q-1),n} \end{bmatrix}$; 36 → $B_q = \begin{bmatrix} b_{q,1} \\ b_{q,2} \\ \vdots \\ b_{q,(n-1)} \\ b_{q,n} \end{bmatrix}$ MAX ORDER OF MSS W/O NOTCH FILTER = $q + j$
FOR GOOD ROLL OFF $q + j \gg p + 1$

*Fig. 4.*

AIRCRAFT FREQUENCY ADAPTIVE MODAL SUPPRESSION SYSTEM

BACKGROUND OF THE INVENTION

The present invention relates to aircraft modal suppression systems, and more particularly to an aircraft modal suppression system compensating for body bending modes when aircraft weight differs from design gross weight (DGW) due to takeoff GW and fuel consumption.

Gust induced aft body lateral oscillations in long slender airplanes can affect comfort and ride quality in the rear section of the passenger cabin. An earlier Boeing-invented modal suppression system, U.S. Pat. No. 5,072,893 assigned to The Boeing Company, used yaw damping to suppress lateral oscillations and control body bending modes. The 5,072,893 patent system replaced the rate gyro with an accelerometer for detection of lateral motion, but does not fully compensate for body bending modes when airplane weight differs from the Design Gross Weight (DGW) due to fuel consumption.

SUMMARY OF THE INVENTION

Accordingly, it is an object of the present invention to provide a frequency adaptive modal suppression system which compensates for weight change by varying the yaw damper output to suppress body bending modes according to a weight signal derived from the Flight Management Computer (FMC).

BRIEF DESCRIPTION OF THE DRAWINGS

FIG. 3 is exemplary of the present variable notch filter which varies depending on the gross weight of the airplane;

FIG. 4 is the general form of the variable section of the adaptive modal suppression system;

FIG. 8 is the phase graph of the lateral acceleration at the aft station for the light-weight airplane; and, FIGS. 9 and 10 are the frequency response graphs in magnitude illustrating the improvement in lateral acceleration at the aft station.

GENERAL DESCRIPTION

The body bending modes are the dominant structural modes of the airplane in the lateral axis. For airplanes with long and slender bodies, especially those stretched versions, the vibration level of the structural modes are quite high, such that they cause ride discomfort. Numerous attempts to solve the ride quality problem prior to the present method embodiment of the invention are: The MSAS system using a gyro to measure yaw rate for feedback in the 70s; the use of a single fixed frequency notch filter located in the output of the basic yaw damper, called the passive control system in 1985; the multiple fixed frequency notch filter in conjunction with the fixed frequency active filters, called aircraft modal suppression system developed in 1987, 1988, and in 1989.

Figure 1:
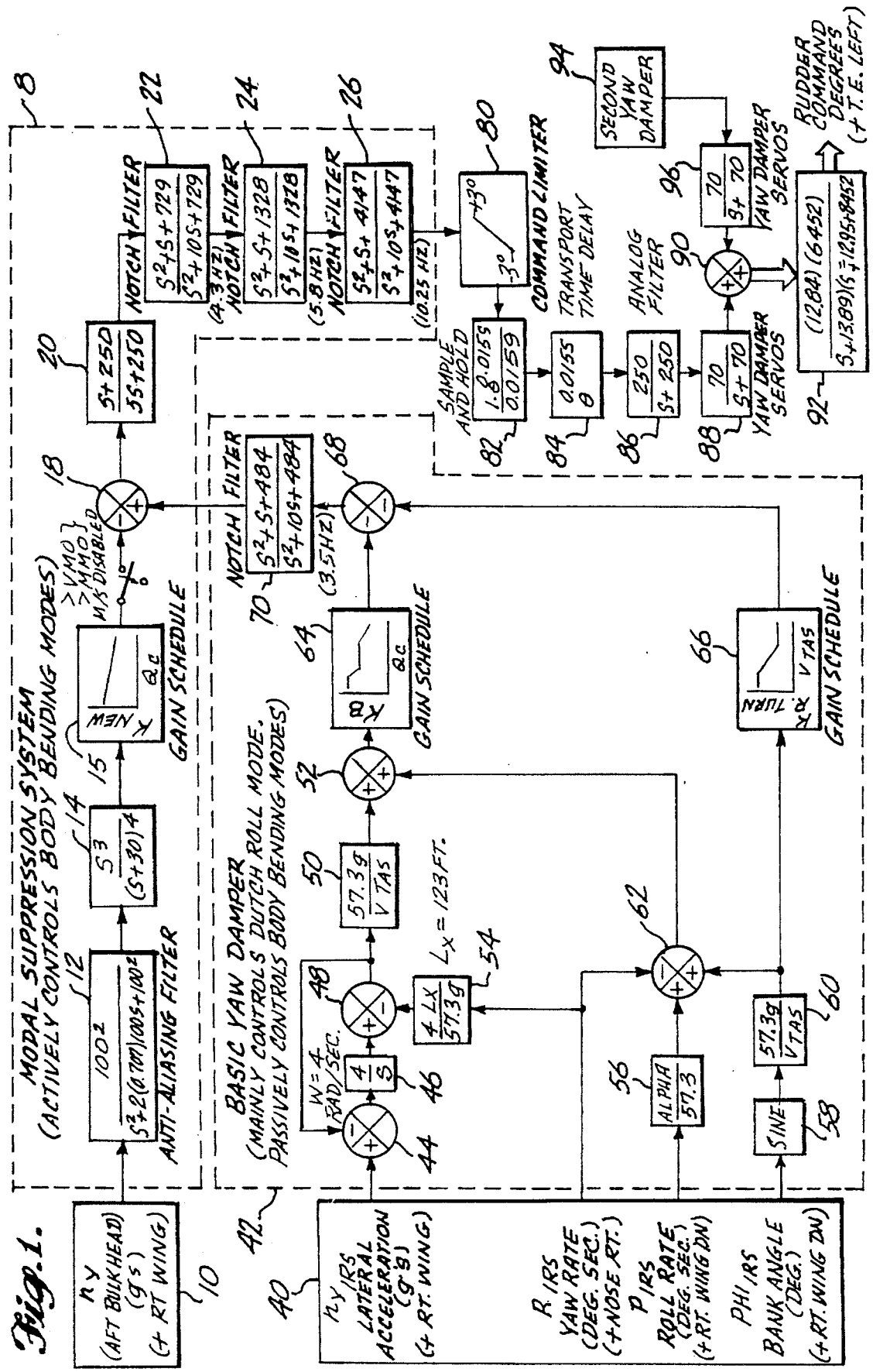
FIG. 1 is a prior aircraft modal suppression system which has a fixed control law for all airplane configurations.

FIG. 1 is the detailed block diagram illustrating current modal suppression system used in aircraft. The current modal suppression system is not fully satisfactory in suppressing the body bending modes when the gross weight of the airplane is different from the design gross weight because:

a) The fixed frequency notch filter in the basic yaw damper cannot prevent the basic yaw damper from exciting the body bending modes.

b) The gain and phase characteristics of the body bending mode vary, which makes the fixed frequency active filter less effective.

The frequency of the body bending mode varies depending on the gross weight of the airplane. The difference in gross weight between the lightest and heaviest long range airplane is more than 200,000 lbs. As a result, the frequency of its first body bending mode varies from around 2.8 to 3.5 Hz. The present frequency adaptive modal suppression system, as hereinafter described, deals with the variation in frequency, which results in variation in phase, of the body bending mode. The present preferred embodiment of the invention brings in the airplane gross weight signal from the flight management computer, which action enables both the passive and active control systems to accurately adapt to the frequency of the body bending modes and produce the precise control signals.

Figure 2:
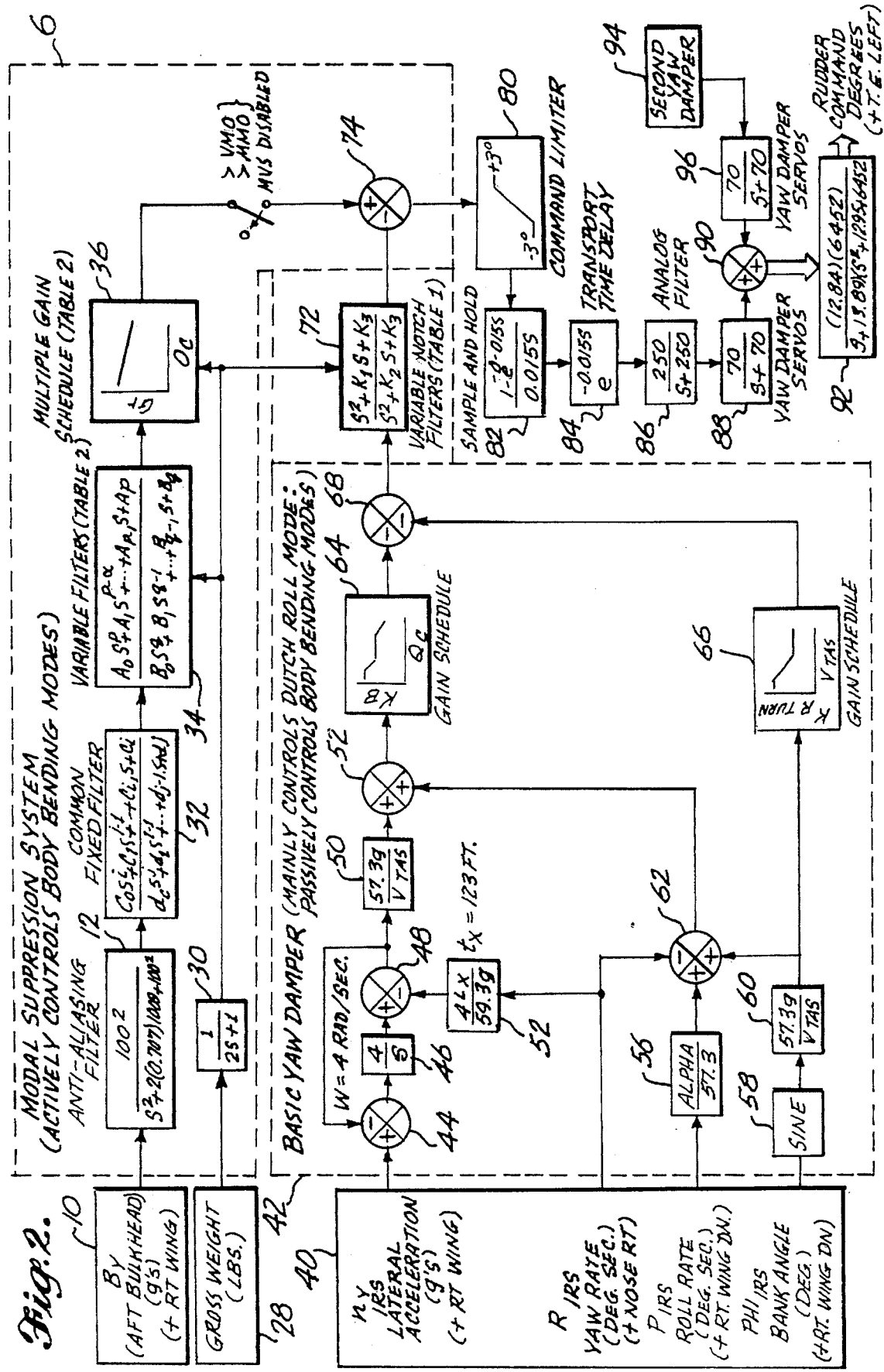
FIG. 2 is a block schematic diagram of the present aircraft frequency adaptive modal suppression system which incorporates the gross weight signal into the control law in order to deal with the variation in frequency of the body bending mode due to the variation of the weight of the airplane.

FIG. 2 is the detailed block diagram illustrating the preferred single accelerometer modal suppression system according to a preferred embodiment of the present invention. While the frequency (coefficients) of the basic yaw damper notch filter (3.5 Hz notch filter) in the current aircraft basic yaw damper is fixed at 3.5 Hz; the coefficients K1, K2, and K3 (see Table 1) of the basic yaw damper notch filter, in accordance with a preferred embodiment of this invention, is tabulated as a function of airplane gross weight. This enables not only the frequency (K3) but also the width and depth (K1/K2) of the notch filter to vary according to the gross weight of the airplane. The frequency range of the body bending modes (same as the frequency range of the notch filter) is determined by sweeping the rudder of the airplane at its heaviest and lightest gross weights. The heaviest gross weight airplane has the first body bending mode at the lowest frequency; the lightest gross weight airplane has the first body bending mode at the highest frequency. The sweep process was produced by using a frequency function generator (FFG) to drive the yaw damper servo with a frequency varying (either ascending or descending) sine wave (or other wave forms) signal at a predetermined rate for a predetermined period of time. The servo, in turn, will drive the rudder of the airplane to create an oscillation throughout the predetermined frequency range. The time response (history) of the acceleration of the aft (and/or forward) station will be collected and transformed into the frequency domain where the frequency of the body bending mode is read. The intermediate frequencies of the body bending mode can be determined by using the same sweeping process for the airplane with gross weights in between. These intermediate frequencies can also be obtained by linearizing the frequency points between the minimum and maximum frequencies if sweeping of the airplane becomes too expensive. Since the gross weight of the airplane changes slowly, the number of frequency points between minimum and maximum frequencies can be chosen to be infinite. However, an increment of 0.1 Hz from the minimum to the maximum frequencies is usually used to select the frequency points and their corresponding gross weight ranges (SWR), as shown hereinafter.

Figure 5:
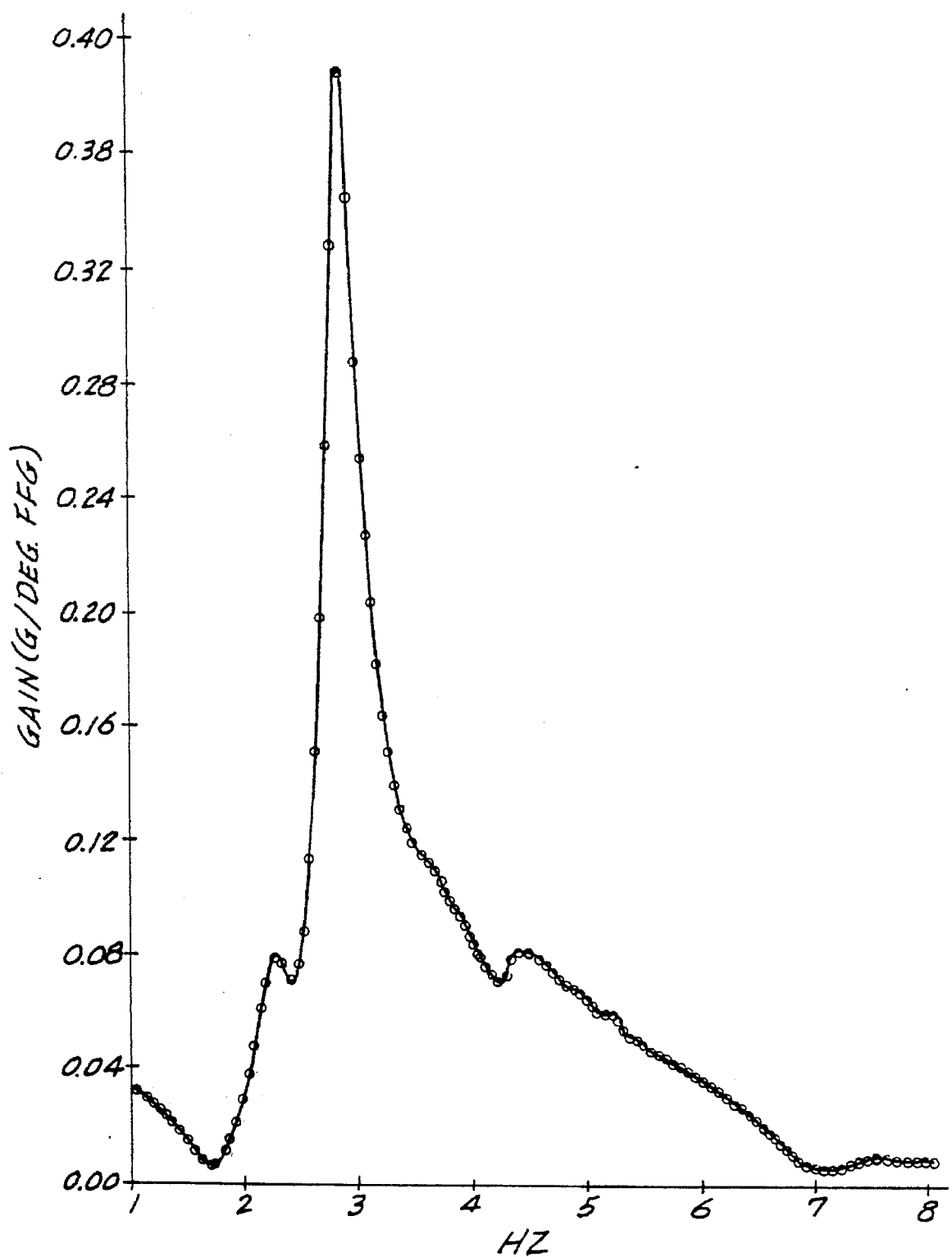
FIG. 5 is the frequency response graph of the lateral acceleration at the aft station for the heavy weight airplane.
Figure 6:
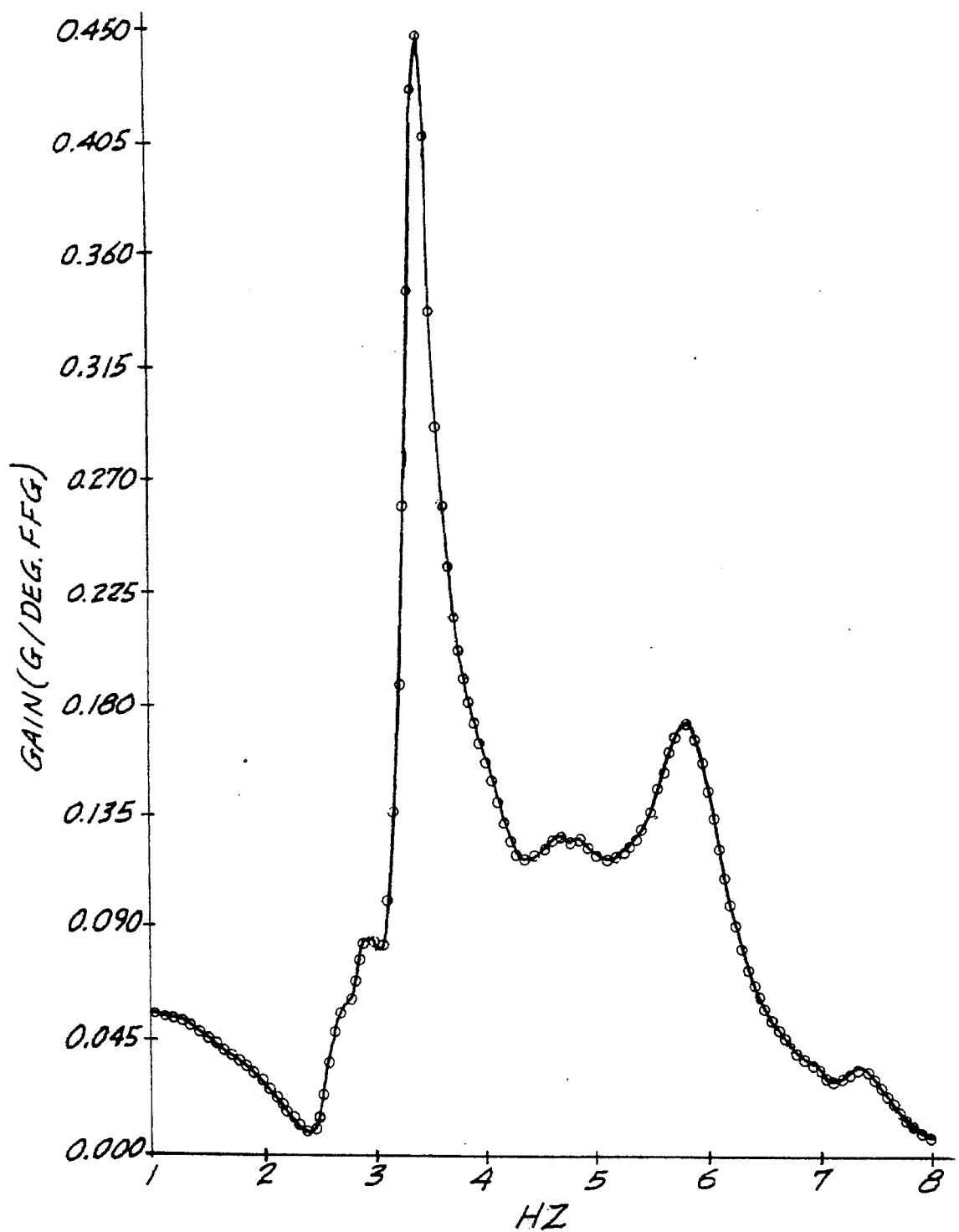
FIG. 6 is the frequency response graph of the lateral acceleration at the aft station for the light weight airplane.

In this case, eight frequency points, starting at 2.8 Hz and ending at 3.5 Hz, or eight gross weight ranges, can be selected as shown in Table 1, FIG. 3. FIGS. 5 and 6 present the body bending mode of the airplane with heavy and light gross weights, respectively. It is apparent that the frequency of the body bending mode is gross weight dependent.

Figure 7:
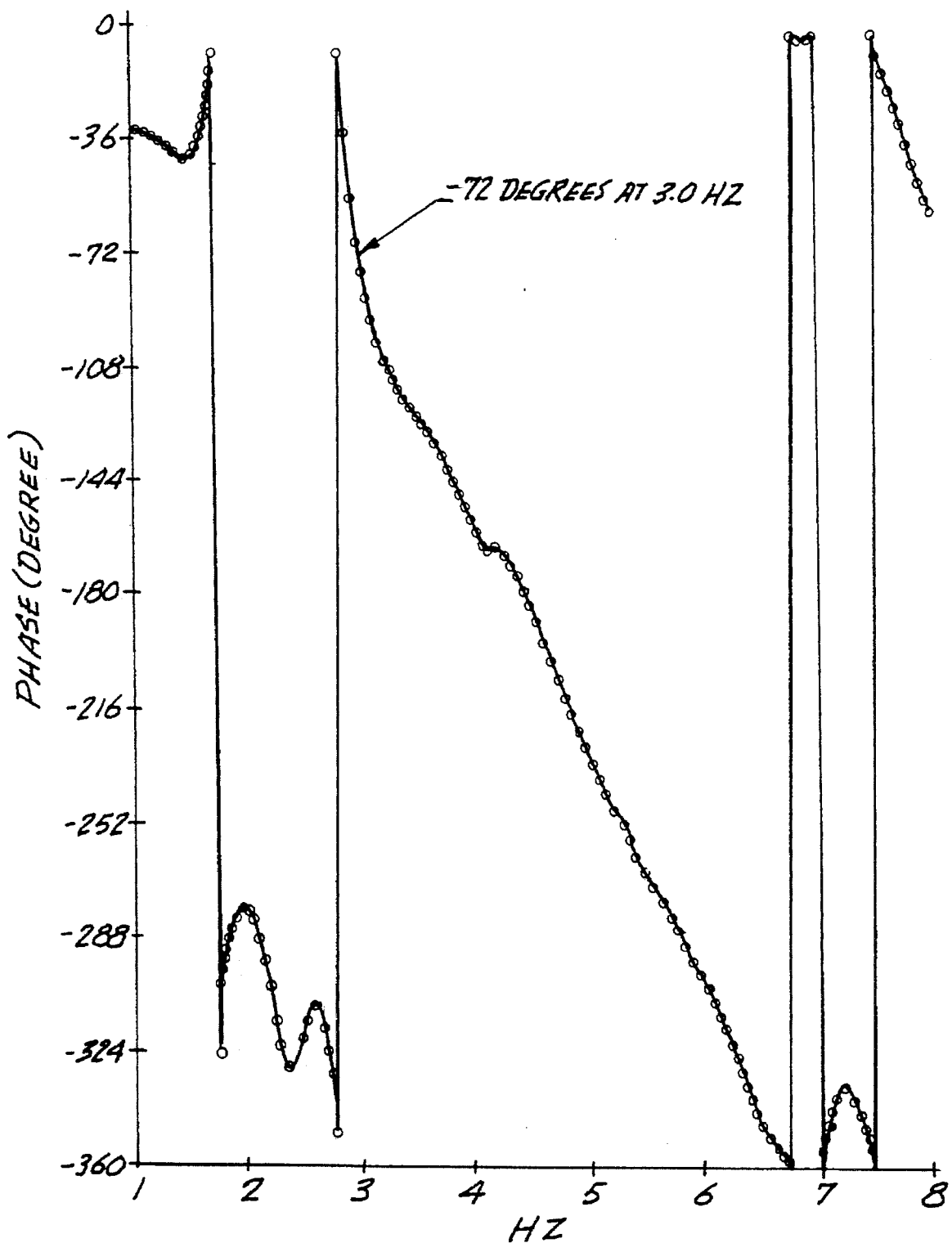
FIG. 7 is the phase graph of the lateral acceleration at the aft station for the heavy weight airplane.
Figure 6:
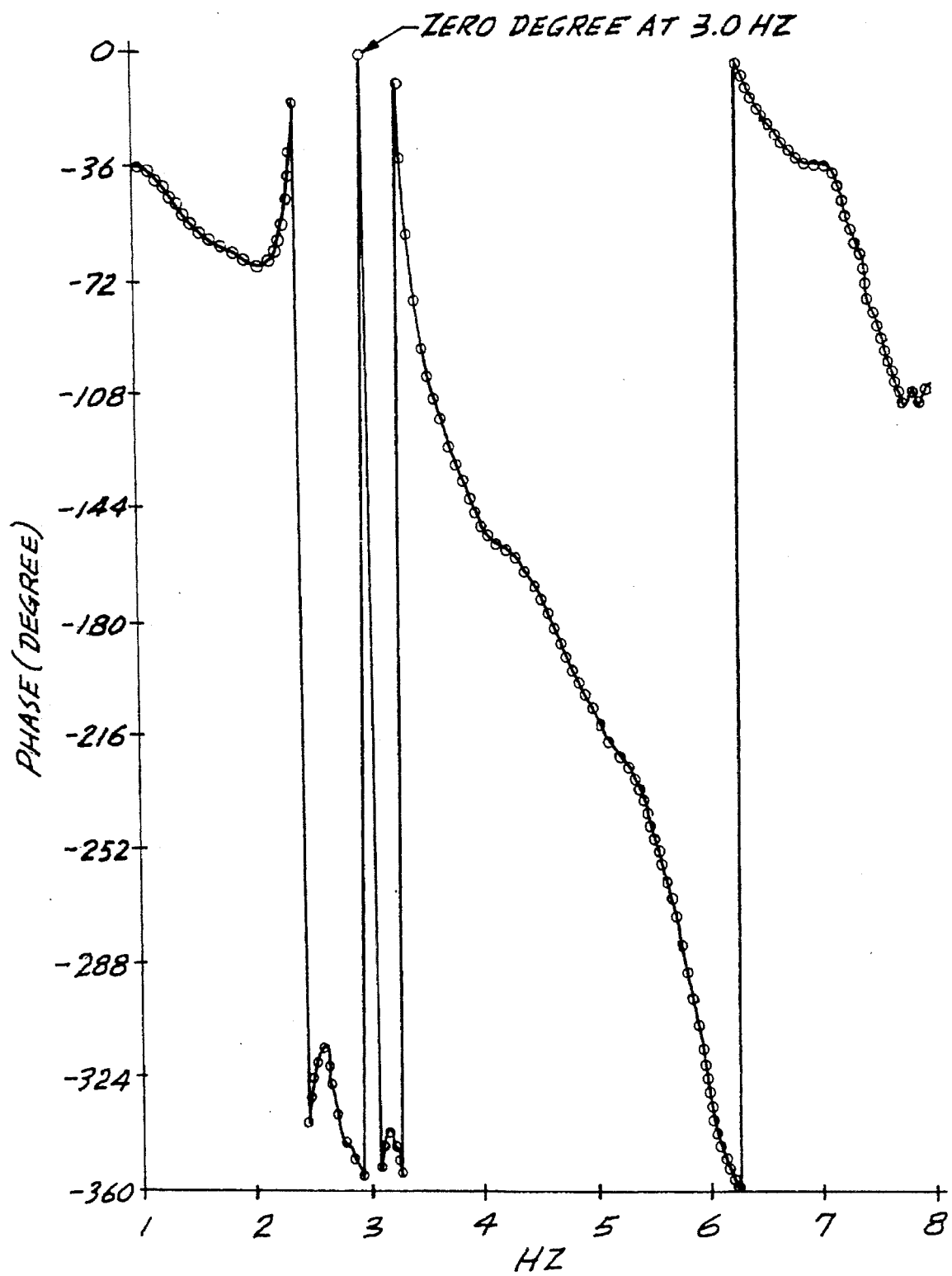

FIGS. 7 and 8 show that the phase of the body bending mode varies dramatically depending on the weight of the airplane. The phase difference of the body bending mode between these particular light and heavy airplanes is 72 degrees at 3 Hz. This is critical, since the control theory behind the aircraft modal suppression system is based on the phase relationships of the control law and the body bending mode to generate the control signal. If the phase of the body bending mode varies while the phase of the filter is fixed, the modal suppression system will not be able to drive the control surface at the right time in order to suppress the acceleration. Driving the control surface at a wrong time may excite the modes or cause the airplane to go unstable, depending on the magnitude of the control signal. By bringing in the gross weight signal as a gain table for the coefficients Ao, ..., Ap and Bo, ..., Bq (see FIG. 2 and FIG. 4, Table 2,), the active filter will be able to match its phase with the phase variation of the body bending modes to generate the proper control signal to suppress the body bending modes. Gain tabulating of the coefficients is not limited to the present aircraft frequency adaptive modal suppression system with one accelerometer, but can be extended to more than one accelerometer as well as many order filters, depending on the memory size and speed of the microprocessor which is used for the frequency adaptive modal suppression system. Gr is a multiple gain schedule which consists of G1 to Gn for n gross weight ranges. In other words, each GWR will have an active filter with its corresponding G gain. However, this does not limit two or more gross weight ranges from sharing a common filter or a common Gr gain. The whole common fixed filter or portion of it can be moved downstream after the modal suppression system and the basic yaw damper summation and before the 3 degrees limiter, if necessary.

DETAILED DESCRIPTION

FIG. 1 is a detailed block diagram illustrating the prior aircraft modal suppression system and the basic yaw damper, which are similar to FIGS. 5 and 6 of U.S. Pat. No. 5,072,893, the details of which are incorporated herein by reference with FIG. 2 herein utilizing corresponding numeral for corresponding circuit elements.

FIG. 2 is a detailed block diagram illustrating the modal suppression system and the basic yaw damper in accordance with the preferred embodiment of the present invention. The differences between the present invention and the system shown in U.S. Pat. No. 5,072,893 are discussed in more detail hereinafter. The present invention incorporates the gross weight signal 28 from the aircraft's on-board flight management computer. This signal is passed through a .5 rad/s low pass filter 30 to filter out any high frequency noise. The filtered gross weight signal is then sent to the variable filter 34, multiple gain schedule 36, and the variable notch filter 72 for filter and gain selection purpose. The analog output from the accelerometer 10, as described in U.S. Pat. No. 5,072,893, is digitized, then passed through an anti-aliasing filter 12 which is designed to eliminate the aliasing effect of digitization. The digital output from the anti-aliasing filter 12 is passed to the common fixed jth order filter 32 where j is only limited by the frame time of the on-board microprocessor. The common fixed filter 32 is the common factor which is pulled out of the multiple path called variable filter 34 in order to reduce the total order of the modal suppression system. The common fixed filter accelerometer signal 32 is then passed to a variable filter 34 where switching (filter selection) takes place based on the gross weight of the airplane (detailed in FIG. 4). The output of the variable filter 34 is passed to the multiple gain schedule block 36 (detailed in FIG. 4) where only the corresponding gain schedule is activated before being summed with the basic yaw damper command.

FIG. 3 is illustrative of the present invention variable notch filter. While the notch filter 70 in FIG. 1 is fixed at frequency 3.5 Hz, the variable notch filter is set to the predetermined frequencies according to the gross weight of the airplane. Table 2 is an example of the variable notch filter concept with n=8 gross weight ranges. By assigning the values of the coefficient K3 to the predefined gross weight ranges, the frequency of the notch filter will vary accordingly and by setting the ratio K1/K2 of the notch filter to the predefined gross weight ranges, the depth and width of the notch filter will also vary accordingly.

FIG. 4 is the expansion of the general form of the multiple gain schedule 10 and the variable notch filter 20. This is basically a multiple path where each path, represented by a filter and its corresponding gain schedule, is assigned to a gross weight range and selected when the filtered gross weight signal falls in the weight range. A single path can be constructed by filling in the general form 20 with a sub-coefficient $a_{0,1}$22, $a_{1,1}$24, ... $a_{p,1}$28, $b_{0,1}$30, $b_{1,1}$32, ... $b_{q,1}$36. Although the shape of each path can be altered by its variable filter, the main function of the variable filter is to provide the proper phase for the system in order to deal with the variation in frequency of the body bending mode. Since the heavy airplane requires more force to control than the light airplane, n sets of gain schedule G1 ... Gn signal from the modal suppression system will be passed to the rudder of the aircraft, and since the force produced by the rudder is a function of impact pressure qc which is a function of speed, altitude, and temperature, the acceleration signal is gain amplified by a gain factor G(1, or .. n) which decreases in value as the impact pressure qc increases.

FIG. 5 is the frequency response graph in magnitude of the lateral acceleration at the aft station which shows that the frequency at the peak of the body bending mode of the heavy airplane is at 2.85 Hz.

FIG. 6 shows that the same airplane at light weight has the peak of the body bending mode is at 3.4 Hz.

FIG. 7 is the phase graph of the lateral acceleration at the aft station for the heavy weight which has a phase angle of −72 degrees at 3 Hz.

FIG. 8 shows the variation in phase from the heavy weight to light weight airplane. The same airplane at light weight has the phase of 0 degree at 3 Hz.

Figure 9:
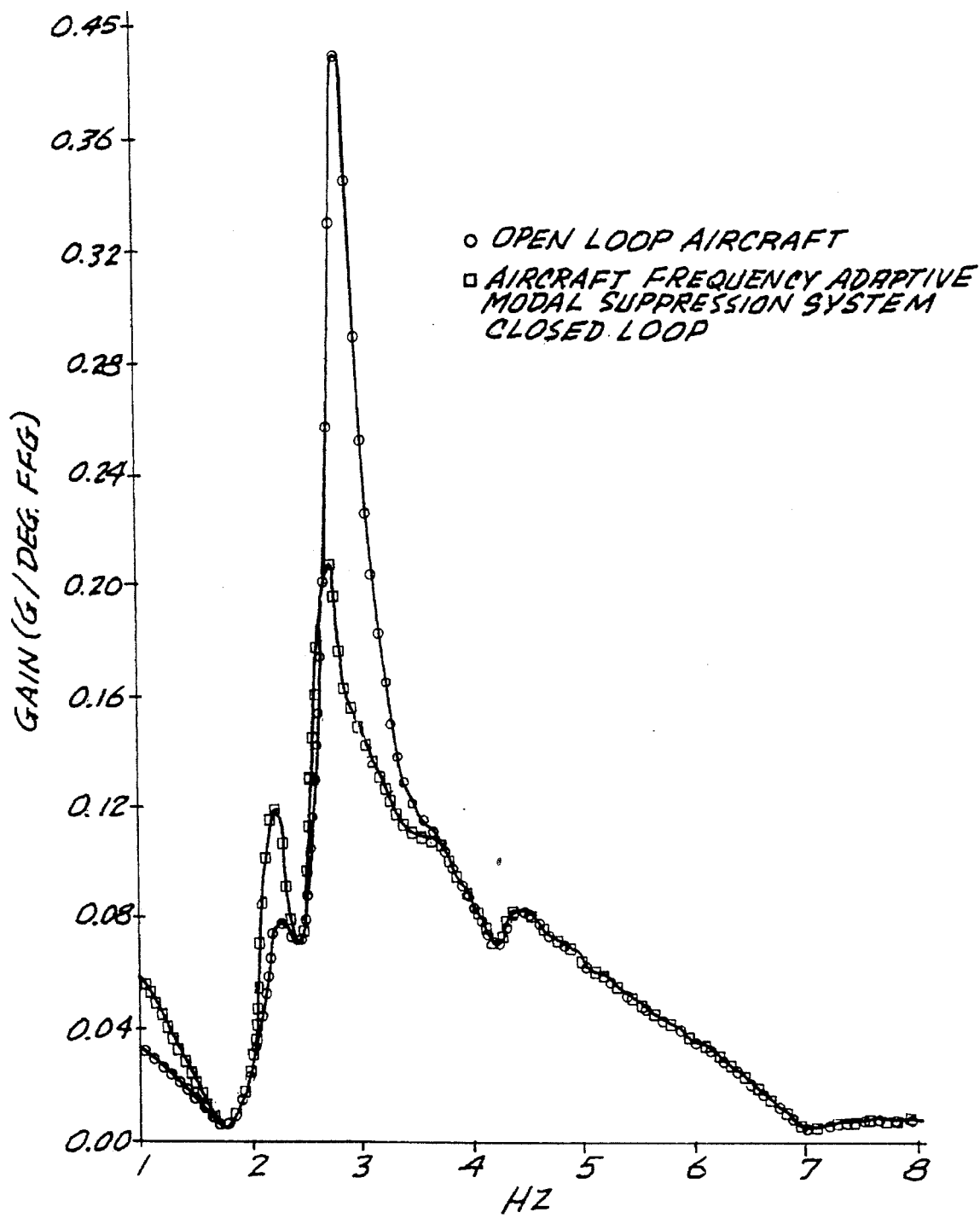
Figure 10:
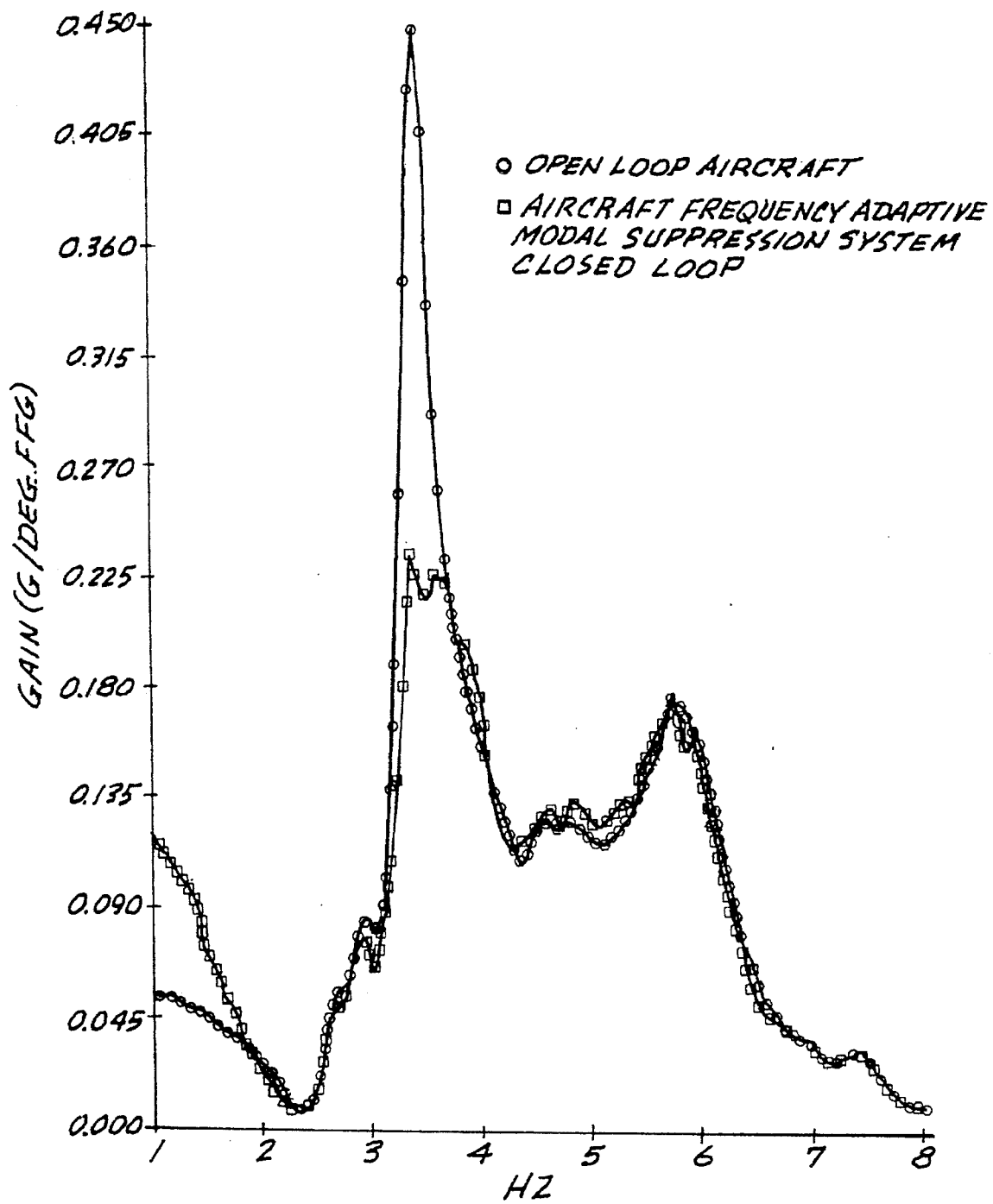

FIGS. 9 and 10 are the frequency response graphs in magnitude illustrating the improvement in the lateral acceleration for both the heavy and light weight airplanes when using the present aircraft frequency adaptive modal suppression system.

What is claimed is:

1. In combination in an aircraft frequency adaptive modal suppression system;

control surface means responsive to control signals;

a signal representative of gross weight of the aircraft;

an active filter coupled to said control surface means for generating a control signal to suppress body bending modes of the aircraft; and, said signal representative of gross weight of the aircraft providing the active filter with the ability to select a predetermined coefficient and gain schedule, thereby enabling said active filter to have a phase matching the phase variation of the body bending modes of the aircraft.

2. In combination in an aircraft modal suppression system:

means for providing a signal representative of gross weight of the aircraft;

filter means responsive to said means for providing a signal representative of gross weight of the aircraft;

said filter means generating, a control signal for suppressing body bending modes of the aircraft, and, wherein said filter means responsive to said means for providing a signal representative of gross weight of the aircraft comprises a notch filter having a frequency and width and depth which varies according to the gross weight of the aircraft.

* * * * *